United States Patent [19]

Werner

[11] Patent Number: 5,065,653

[45] Date of Patent: Nov. 19, 1991

[54] TWIST-SHEARING APPARATUS

[75] Inventor: John A. Werner, Milwaukee, Wis.

[73] Assignee: Toolrite Manufacturing Company, New Berlin, Wis.

[21] Appl. No.: 571,216

[22] Filed: Aug. 23, 1990

[51] Int. Cl.$^5$ ............................................. B23D 23/04
[52] U.S. Cl. ....................................... 83/199; 83/589; 83/602
[58] Field of Search ................ 83/196, 199, 200, 529, 83/589, 602, 276

[56] References Cited

U.S. PATENT DOCUMENTS

| | | | |
|---|---|---|---|
| 690,083 | 12/1901 | Stolpe | 83/199 |
| 2,744,574 | 5/1956 | Fulger | 83/199 |
| 3,084,795 | 4/1963 | McArthur | 83/200 X |
| 3,998,117 | 12/1976 | Fujibayashi | 83/199 |
| 4,438,670 | 3/1984 | Johnson | 83/199 X |
| 4,887,447 | 12/1989 | Schweitzer | 83/200 X |

Primary Examiner—Douglas D. Watts
Assistant Examiner—Eugenia A. Jones
Attorney, Agent, or Firm—Hill, Van Santen, Steadman & Simpson

[57] ABSTRACT

An apparatus for shearing extruded stock includes a stationary die and a rotatable die mounted adjacent one another wherein the rotatable die moves through a limited angle of rotation through the operation of a cam acting on a lever linked to the spindle in which the rotatable die is mounted. The cam undergoes a full 360° of rotation although the rotatable die undergoes a limited angle of rotation. A spring or regulated pneumatic cylinder is provided to bias the rotatable die to the home position after cutting of the extruded stock.

18 Claims, 2 Drawing Sheets

TWIST-SHEARING APPARATUS

BACKGROUND OF THE INVENTION

1. Field of the Invention

The present invention relates generally to an apparatus for shearing of extruded stock and the like and, more particularly, to an apparatus for twist-shearing of extruded stock into sections of predetermined length.

2. Description of the Related Art

Elongated stock material is frequently cut into sections of predetermined length to form articles such a brackets, braces, spacers, clamps and other parts. Such elongated stock is often produced by extrusion and, thus, is of a constant cross section throughout its length. It is also possible, however, that the elongated stock has been produced by drawing, such as for pipe or wire, by rolling, such as for bar stock, or by other techniques. The elongated stock material is generally of constant cross-sectional shape, although it is possible that it has been machined before being cut and so has variations in its shape. For purposes of the present invention, the term extruded stock shall include each of the foregoing types of elongated stock, as well as other types which may pass through a twist-shearing die and, thus, come within the scope of the present invention.

The most common method for cutting extruded or elongated stock is by sawing. However, sawing produces burrs at the cut line, generates heat, dust, grit and noise, and wastes material, since up to one eighth inch of material may be lost for each cut. The stock must be clamped firmly in place during sawing to insure an even and square cut, and such clamping may result in denting or otherwise damaging or deforming thin walled stock. Due to the high speed operation of the saws, operators must wear safety goggles, face protectors and ear protectors.

Rotating die cut-off machines are known in the art in which a rotating die is rotated relative to a stationary die about 360° to shear or cut-off lengths of extruded stock which is passed through openings in the two dies. Although such devices overcome many disadvantages of sawing, these devices tend to be slow.

SUMMARY OF THE INVENTION

An object of the present invention is to shear extruded stock and the like quickly, quietly and accurately without loss of material, generating heat or dust, and without deforming the material being cut.

Another object of the invention is to provide a shearing apparatus for extruded stock which is of simple yet effective construction, and which requires only limited rotation of the rotatable die.

A further object of the present invention is to completely separate lengths of extruded stock as they are cut by a shearing apparatus, without producing burrs or the like.

Yet another object of the invention is to provide an oscillating die shearing machine capable of cutting materials of all cross-sectional configurations.

These and other objects and advantages of the invention are achieved in an oscillating die shearing apparatus having a means for holding a first shearing die in a stationary position to accept extruded stock and the like, a means for holding a second shearing die abutting the first shearing die and in registration with the first shearing die and a means for rotating the second shearing die relative to the first shearing die to shear the extruded stock into sections of predetermined length. The first and second shearing dies have openings extending therethrough which are of the same shape as the cross section of the extruded stock, and only slightly larger so that the extruded stock may slip through the openings of the two dies when the openings are in registration. The stock is cut, or sheared, when one of the dies is rotated relative to the other.

The means for rotating the second shearing die includes a lever extending from the means for holding the second shearing die and a cam that pushes the lever so that the second die is rotated. The action of the cam rotates the die lever about only a relatively small angle, and a means for returning the lever to a home position is provided. The motion of the second die may, thus, be described as oscillating. The oscillating motion of the rotatable die reduces the idle time between the cutting actions of the shearing dies over that of dies cutters that rotate the second die completely around and, therefore, speeds cutting by the present device.

Means for rotating the cam is provided to move the cam against the die lever, including a cam shaft on which the cam is mounted and a motor, for example an electric or hydraulic motor, for rotating the shaft. The cam thus undergoes a full 360 degrees of rotation even though it causes a limited angular motion of the die lever.

In the preferred embodiment, the cam includes a cam body extending radially from the camshaft, and on the end of the cam body is mounted a roller for rolling along the surface of the die lever as the camshaft is rotated. The length of the cam body and the position of the cam shaft relative to the die lever determines the extent of angular rotation of the die lever. In an exemplary embodiment, the die lever rotates approximately 20° from its home position during each rotation of the cam. The angular rotation of the die lever may be varied as needed by changing to a different cam body or roller or by varying the relative positions of the lever and cam. It is also contemplated to provide a cam with more than one eccentricity so that multiple cutting actions occur for each rotation of the cam shaft.

The die lever is returned to its home position after cutting by a spring mounted to bias the lever toward the home position. The home position of the die lever is determined by a stop which is adjustable by a threaded adjuster to insure proper registration of the second, or oscillating, die with the stationary die. An alternate embodiment includes a regulated pneumatic cylinder mounted to bias the lever to the home position.

The motor to drive the rotary cam may be a standard electric or hydraulic motor which is connected to an input of a speed reducer, the output of which is connected through a clutch to the camshaft of the rotary cam. The speed of the camshaft determines the number of cuts that are performed by the present device within a time period, and the speed of the cutting action. The camshaft speed also determines the amount of time that the lever and the second die remain in the home position between cuts, which in turn determines the amount of time available for moving the extruded stock forward into position for the next cut. For a single eccentricity cam, the number of cuts per minute equals the revolutions per minute of the cam shaft.

DESCRIPTION OF THE PREFERRED EMBODIMENTS

Figure 1:
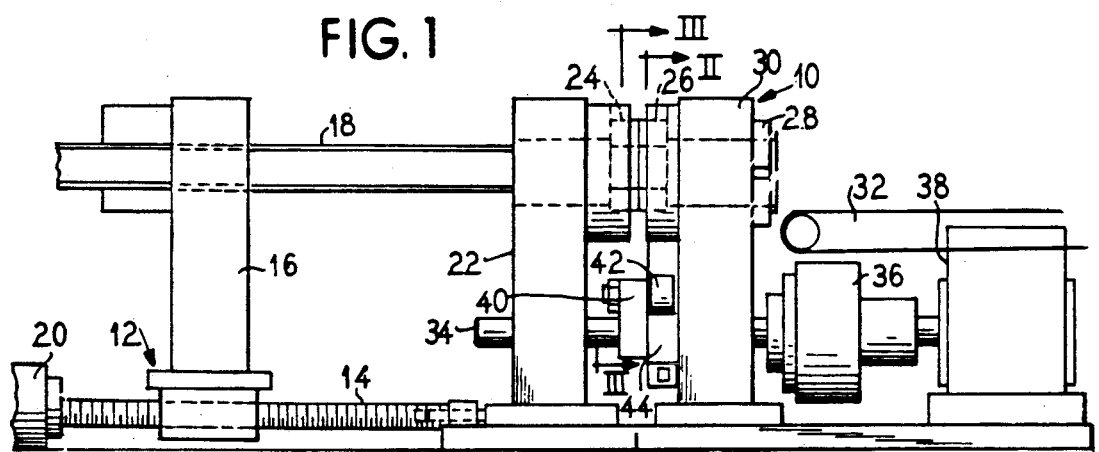
FIG. 1 is a side-elevational view of an oscillating die shearing apparatus according to the principles of the present invention.

In FIG. 1 is shown an oscillating die shearing apparatus 10 which is fed by a ball-screw conveyor unit 12 having a threaded screw 14 on which is carried a stock holder 16 for engaging a length of extruded stock or the like 18. The stock holder 16 of the preferred embodiment includes pneumatic grippers (not shown) for holding the stock 18 as it is advanced into the shearing apparatus 10. By rotation of the threaded screw 14, by, for instance, a stepper motor 20, the extruded stock 18 is moved incrementally into the shearing apparatus 10 for cutting into predetermined lengths.

The shearing apparatus 10 includes a stationary die housing 22 which holds a stationary die 24 abutting a rotatable, or movable, die 26. The movable die 26 is supported in a spindle 28 that is rotatably mounted in a spindle housing 30. An exit conveyor 32 extends from an outlet opening of the spindle 28 and is operable to carry away parts which have been cut off by the present shearing apparatus.

Extending between the stationary die housing 22 and the spindle housing 30 is an output shaft 34 of a single revolution clutch 36, which in turn is driven by the output of a speed reducer 38. Mounted on the shaft 34 is a cam 40 including a cam roller 42 that is moveable into abutment against a lever 44.

Figure 2:
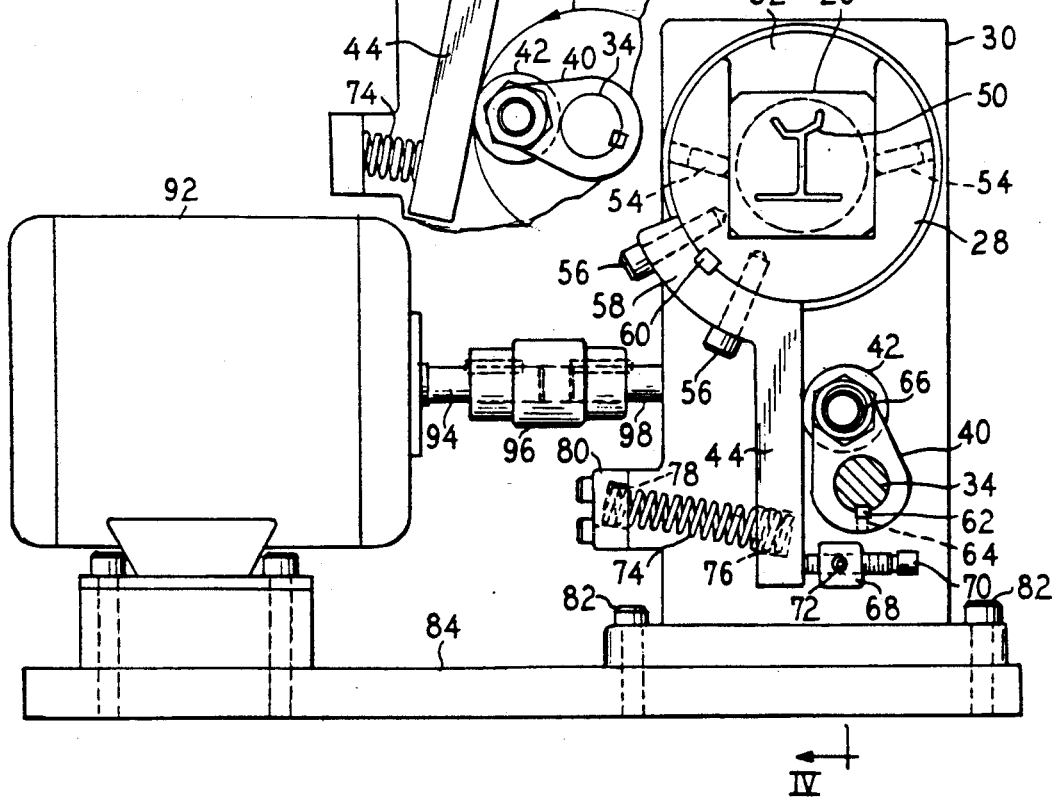
FIG. 2 is a cross section along line II—II of the oscillating die shearing apparatus of FIG. 1.

Referring to FIG. 2, the spindle housing 30 with the die spindle 28 and the movable, or rotatable, die 26 is shown in cross section at the dividing line between the movable die 26 and the stationary die 24. The movable die 26 has an opening 50 extending therethrough, which opening 50 corresponds to the cross-sectional shape of the extruded stock 18 which is being cut-off. Thus, a different die is used for each different configuration and size of extruded stock. The movable die 26 is insertable into the spindle 28 through an opening 52 in the top of the spindle 28 and the rotatable die 26 is held in place in the spindle 28 by a pair of set screws 54. As seen in FIG. 2, the set screws 54 are angled downwardly relative to the opening 52 in the spindle 28 so that a force is exerted on the rotatable die 26 to hold the die in place.

The rotatable die 26 is rotated by rotation of the spindle 28, which is accomplished by moving the die lever 44. The lever 44 is attached to the spindle 28 by a pair of bolts 56 extending through an arcuate portion 58 of the lever 44 which lies on the outer surface of the spindle 28. To assure a positive lock between the motion of the lever 44 and the spindle 28, a key 60 is provided in notches formed in the inner surface of the arcuate portion 58 and in the outer surface of the spindle 28 where the arcuate portion abuts it.

With the arcuate portion 58 of the lever 44 mounted on the spindle 28, the lever 44 is moved to rotate the spindle 28. To accomplish this, the cam 40 is mounted on the shaft 34 for rotation with the shaft 34 through the use of a key 62 extending therebetween. The key 62 is held in place by a set screw 64. The cam 40 does not contact the lever 44 but instead carries the cam roller 42 for contact with the lever 44. The cam roller 42 is mounted at a distal end of the cam 40 by a bolt 66. Movement of the lever 44 through the rotation of the shaft 34 will be described in greater detail in conjunction with FIG. 3.

The lever 44 is shown in a home position in FIG. 2 which is defined by a stop block 68 which carries a threaded stop screw 70. The stop screw 70 is adjusted in the stop block 68 until the desired home position of the lever 44 is achieved. The stop screw 70 is then secured in the desired position by a set screw 72 extending into the stop block 68.

The lever 44 is biased toward the home position by a helical spring 74 which extends between a bore 76 at a distil end of the lever 44 and a bore 78 in a spring anchor 80. The spring 74 is mounted in compression to urge the die lever 44 against the stop screw 70. Although a helical compression spring is shown, it is, of course, possible to provide alternate biasing means for the lever, such as a regulated pneumatic cylinder.

The base of the spindle housing 30 is mounted by bolts 82 to a base plate 84 upon which the system components are mounted. Also shown in FIG. 2 is an electric drive motor 92 which is likewise mounted on the baseplate 84, the electric motor having an output shaft 94 connected by a shaft coupling 96 to an input shaft 98 of the speed reducer 38. It is also contemplated that the illustrated motor may be a hydraulic motor in place of the electric motor.

Figure 3:
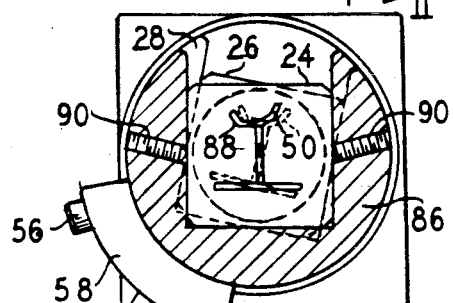
FIG. 3 is a cross section along line III—III through the movable die of the apparatus shown in FIG. 1.

In FIG. 3, the stationary die 24 held in a die holder 86 which is supported in the die housing 22 is shown in cross section. The stationary die 24 has a through opening 88 which is substantially identical to the opening 50 in the rotatable die 26. Just as the rotatable die, the stationary die 24 is also held in the die holder 86 by downwardly angled set screws 90.

When the lever 44 is in the home position as shown in FIG. 2, the openings 88 and 50 are in registration and extruded stock 18 can pass freely therethrough. However, movement of the lever 44 to rotate the spindle 28 causes the openings 88 and 50 to twist relative to one another, as shown in dotted outline in FIG. 3, so that the extruded stock passing through the openings 88 and 5 is sheared at the plane joining the stationary die 24 and rotatable die 26. This is brought about by rotation of the shaft 34 so that the cam roller 42 pushes against and rolls along the surface of the lever 44. The motion of the cam roller 42 is shown in FIG. 3 by an arcuate arrow C. FIG. 3 shows the extreme-most position of the cam 40 relative to the lever 44 and therefore the farthest movement of the lever 44 from the home position shown in FIG. 2. Movement of the cam 40 beyond the illustrated position allows the lever 44 to return to the home position. Thus, for each full rotation of the shaft 34, the lever arm 44 moves by only approximately 20°, in the illustrated example, from the home position so that the total lever travel for timing purposes is approximately 40°. The movement of the lever may be as much as 90 degrees from the home position, for a total angular travel of 180 degrees.

When a single eccentric cam, as shown, is used, the cam roller 42 is out of contact with the lever 44 during a portion of the rotation of the cam shaft 34, thereby permitting the movable die 26 to remain in the home position during a portion of the cutting cycle. This so-called "idle time" of the shearing apparatus permits the extruded stock 18 to be moved incrementally through the two dies 24 and 26 into the next position for cutting. The limited rotation of the rotatable die speeds along the shearing process, since only 40° of rotatable die movement is utilized in this embodiment. For an input speed of the cam shaft of 60 rpm, one part is cut each second and the cutting time is 0.11 seconds. The amount of time for each cutting cycle is easily varied by changing the input speed of the cam shaft.

Depending upon the part to be sheared by the present apparatus, the radial length of the cam 40, or cam rise, may be varied to rotate the lever and rotatable die by lessor or greater amounts. For instance, it may be possible to rotate the rotatably die by up to 180° of total angular travel, as set forth above, to accommodate larger parts.

Figure 4:
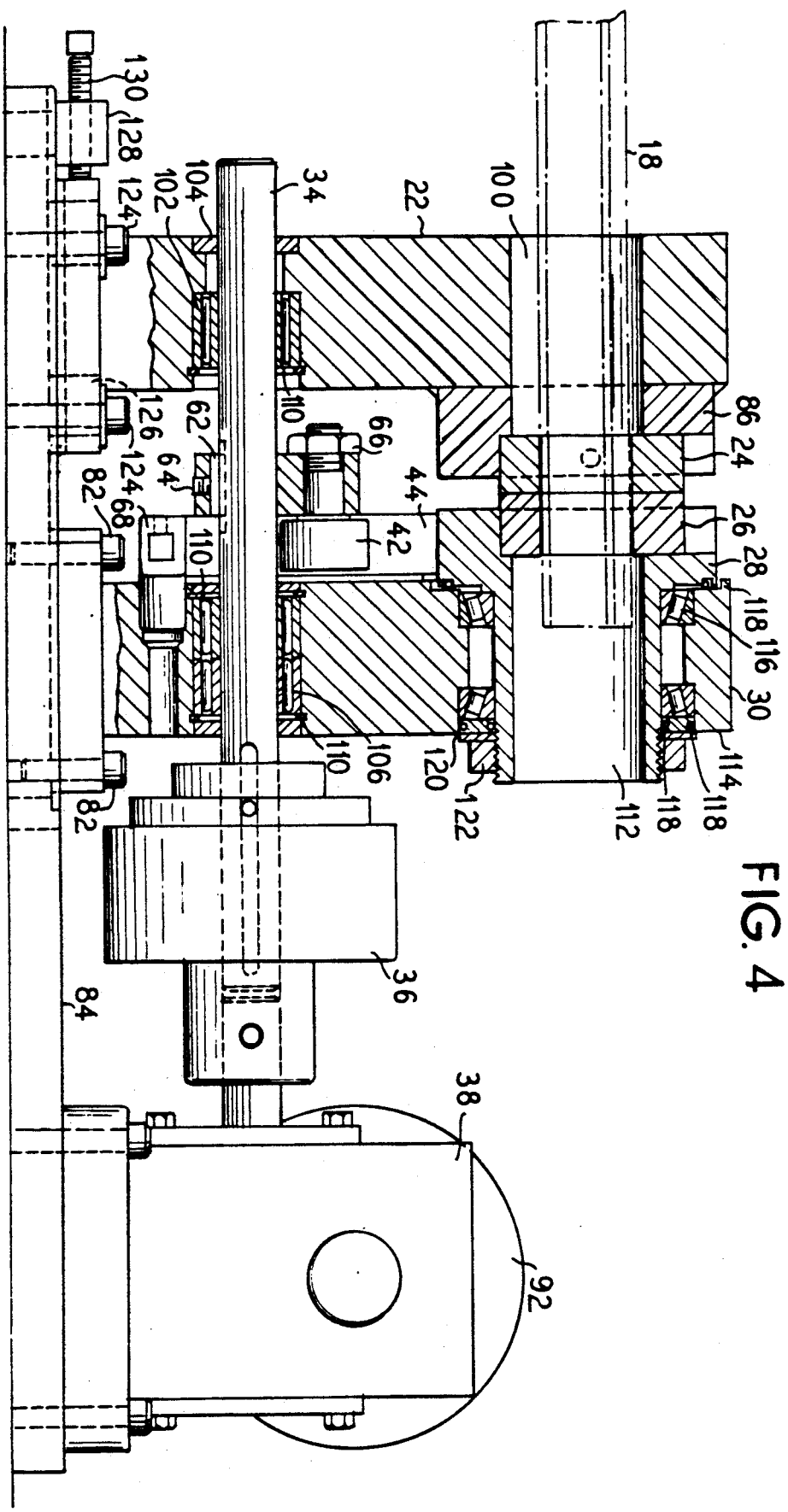
FIG. 4 is a cross section through the oscillating die shearing apparatus of FIG. 2 along line IV—IV.

FIG. 4 shows the internal structure of the die housing 22 and spindle housing 30. The die housing 22 has the die holder 86 affixed thereto, such as by welding and holds the stationary die 24 in place. Both the die housing and die holder include an inlet passage 100 into which the extruded stock 18 is inserted for shearing. The shaft 34 is mounted for rotation in the die housing 22 by needle bearings 102 and a seal 104 such as a rawhide seal is provided at the passageway for the shaft 34. The shaft 34 is also mounted by needle bearings 106 in the spindle housing 30. Snap rings 110 hold the needle bearings 102 and 106 in place.

In the upper portion of the spindle housing 30 is mounted the spindle 28 which holds the rotatable die 26 and includes an outlet passageway 112 from which the sheared portions of the extruded stock 18 pass. To hold the spindle 28 in the spindle housing 30, opposed roller bearing sets 114 and 116 are provided. O-ring seals 118 seal the bearing chamber from the outside, and the bearings 114 and 116, which in the preferred development are timken bearings, are held in place by a lock washer 120 and nut 122, such as a timken nut, which is threaded on the outer surface of the spindle 28.

Since each size and cross-sectional configuration of extruded stock requires a different set of dies, the present apparatus is configured for easy interchange of the dies 24 and 26. The set screws 54 and 90, as shown in FIGS. 2 and 3, respectively, permit the dies to be easily removed and replaced by different dies. As described above, the angle of the set screws 54 and 90 insure that the dies are held securely in the corresponding die housing at a predetermined position. Since different die sets may be of different thicknesses, the die housings are adjustable relative to each other. Accordingly, the die housing 22 is mounted to the base plate 84 by bolts 124 extending through slots 126 in the lower portion of the housing 22. It is thus possible to adjust the die housing 22 so that the end face of the stationary die 24 abuts the end face of the rotatably die 26. To aid in this adjustment and to insure that the two die housings do not separate, a stop member 128 is provided with a threaded stop screw 130 which presses against the base of the die housing 22.

Also in FIG. 4 can be seen the stop block 68 extending into the spindle housing 30, the single revolution clutch 36 mounted on the shaft 34, and the speed reducer 38 mounted at the output of the electric motor 92. It is possible that the order of the speed reducer and the clutch may be interchanged, or that a combination speed reducer and clutch may be used. These elements may be eliminated by appropriate selection of a motor, such as a low speed, high torque motor.

Thus, there is provided a twist shear apparatus with a stationary die and an oscillating movable die for cutting various types of material. The present device produces no chips, grit or waste material from the part being cut, does not produce undesirable heat, requires no clamping of the parts to be cut and eliminates distortion from the clamping of thin walled parts. Material having different cross-sectional configurations may be cut, including T sections, L sections, I section, U sections, O sections, H, F, Z etc. The thicknesses of the material to be cut can be of any value and the speed of the cut will remain constant regardless of the thickness of the wall. It is even possible to cut solid bar stock with the present apparatus. The materials which can be cut, or sheared, includes steel, aluminum, brass, copper, stainless steel, plastic, and other materials. With the present device it is easier to produce a square cut.

It is contemplated that by offsetting the openings 50 and 88 as shown in FIG. 3 relative to the rotation axis of the rotatable die, that no material is left connecting the cut parts together. Thus, the present device completely separates the parts being cut from one another.

Thus, there is shown and described a twist shearing apparatus for cutting off extruded stock into sections of predetermined lengths. By controlling the in-feed of the extruded material, the length of the stock to be cut can be controlled to within one thousandth of an inch. Due to the limited rotation of the rotatable die, cutting speed is increased over that of shearing apparatus in which the die undergoes a full 360° of rotation. The present device is quiet, efficient, avoids waste, is clean and economical. The device is also suitable for automatic or semiautomatic operation and, in the illustrated version, is compact enough to set on a desk top. It is also contemplated to provide larger versions of the present device which are capable of cutting eight or ten inch I-beams, angle irons, or the like having wall thicknesses of one inch or more, yet which achieves the same benefits of speed and efficiency as the smaller versions of the device.

Although other modifications and changes may be suggested by those skilled in the art, it is the intention of the inventor to embody within the patent warranted hereon all changes and modifications as reasonably and properly come within the scope of his contribution to the art.

I claim:

1. A rotary cut-off apparatus for shearing extruded stock using first and second shearing dies, comprising:
    means for moving extruded stock into the rotary cut-off apparatus at a predetermined rate;
    means for holding a first shearing die stationary in a position to accept the extruded stock;
    means for holding a second shearing die abutting said first shearing die and in registration with said first shearing die when in a first position, said means for holding said second shearing die being rotatable about a die axis of rotation relative to said means for holding said first shearing die;
    means for rotating said second shearing die from said first position relative to said first shearing die through a limited angle of rotation about said die axis of rotation to shear the extruded stock that extends through said first and second shearing dies into pieces of predetermined lengths, said means for rotating including:

a die lever connected to said means for holding said second shearing die and extending generally radially therefrom relative to said die axis of rotation, a cam mounted for rotation on a cam axis of rotation, said cam axis of rotation being generally parallel to said die axis of rotation, said cam having an eccentric movable against said die lever upon rotation of said cam about said cam axis of rotation to bear against said die lever and cause said die lever to rotate said means for holding said second shearing die relative to said means for holding said first shearing die, said limited angle of rotation resulting from a radial extent of said eccentric of said cam, and means for rotating said cam about said cam axis of rotation.

2. A rotary cut-off apparatus as claimed in claim 1, wherein said means for rotation said cam includes a cam shaft; and wherein said cam includes:
a cam lever mounted on said cam shaft, said eccentric being a free end portion of said cam lever extending radially from said cam shaft, and
a roller rotatably mounted on said free end portion of said cam lever, wherein said roller intermittently contacts said die lever as said cam shaft is rotated.

3. A rotary cut-off apparatus as claimed in claim 2, wherein said means for rotating said cam includes:
a motor,
a speed reducer connected at an output of said motor, and
a clutch connected between said motor and said cam.

4. A rotary cut-off apparatus as claimed in claim 3, wherein said motor is an electric motor.

5. A rotary cut-off apparatus as claimed in claim 3, wherein said motor is a hydraulic motor.

6. A rotary cut-off apparatus as claimed in claim 3, wherein said speed reducer has an output shaft, and wherein said clutch is connected to said output shaft of said speed reducer so that an output shaft of said clutch is said cam shaft.

7. A rotary cut-of apparatus as claimed in claim 1, further comprising:
a spring mounted to bias said die lever toward said first position.

8. A rotary cut-off apparatus as claimed in claim 1, further comprising:
an adjustable stop member mounted to abut said die lever when said die lever is in said first position and thereby prevent rotation of said die lever past said first position, said adjustable stop member being adjustable so as to selectively align the second shearing die with the first shearing die when in the first position.

9. A rotary cut-off apparatus as claimed in claim 1, wherein said means for holding a second shearing die includes:
a spindle housing, and
a die spindle mounted in said spindle housing by bearings for rotation relative to said spindle housing, said die spindle having an opening for accepting the second shearing die and means for affixing said second shearing die in position in said die spindle.

10. A rotary cut-off apparatus as claimed in claim 1, wherein said limited angle of rotation is within a range of approximately 20 to 90 degrees from said first position.

11. An oscillating die shearing apparatus for cutting extruded stock into pieces of predetermined lengths, comprising:
means for holding a stationary die at a predetermined stationary position;
means for holding a rotatable die in abutment with the stationary die so that the rotation die is in registration with the stationary die;
means for automatically and repeatedly rotating the rotatable die about a die axis of rotation perpendicular to a plane of abutment between the stationary die and the rotatable die, said means for rotating moving the rotatable die out of registration with the stationary die to shear extruded stock extending through both the stationary die and the rotatable die, said means for rotating causing the rotatable die to move less than 180 degrees from a position in registration with the stationary die, said means for rotating including:
a cam abutting surface connected to said means for holding said rotatable die and being radially spaced from said die axis of rotation,
a cam mounted for 360 degree rotation about a cam axis of rotation, said cam having an eccentric movable against said cam abutting surface upon each rotation of said cam so that said eccentric repeatedly bears against said cam abutting surface and causes said means for holding said rotatable die to rotate relative to said means for holding said stationary die, said rotatable die remaining in registration with said stationary die when said eccentric is free of said cam abutting surface as said cam rotates, and
means for rotating said cam by 360 degrees about said cam axis of rotation; and
means for returning the rotatable die to the position in registration with the stationary die.

12. An oscillating die shearing apparatus as claimed in claim 11, wherein said means for holding the rotatable die includes:
a spindle housing having an opening extending therethrough;
a spindle mounted in said opening in said spindle housing for rotation about an axis, said spindle having an opening for accepting the rotatable die;
and wherein said cam abutting surface includes:
a die lever extending generally radially from said spindle and having a cam engaging surface.

13. An oscillating die shearing apparatus as claimed in claim 12, wherein said means for returning the rotatable die is a helical spring mounted in compression.

14. An oscillating die shearing apparatus as claimed in claim 12, wherein said cam includes a rotatably mounted roller mounted to contact said cam engaging surface of said die lever.

15. An oscillating die shearing apparatus as claimed in claim 12, further comprising:
an adjustable stop mounted on said spindle housing and adjustable into a position to contact said die lever when the rotatable die is in registration with the stationary die and inhibit movement beyond this position.

16. An oscillating die shearing apparatus as claimed in claim 15, wherein said adjustable stop includes a threaded adjustment screw.

17. An oscillating die shearing apparatus as claimed in claim 12, wherein said spindle includes set screws on at least one side of said opening in said spindle for engaging and holding the rotatable die; and wherein said means for holding the stationary die includes a holder having an opening for accepting a stationary die and set screws for engaging the stationary die; said set screws being angled to exert a force on a corresponding one of the dies into the openings.

18. An oscillating die shearing apparatus for cutting extruded stock into predetermined lengths, comprising:
   means for holding a stationary die at a predetermined stationary position;
   means for holding a rotatable die in abutment with the stationary die so that the rotatable die is in registration with the stationary die when in a first position, said means for holding said rotatable die being rotatable about an axis of rotation perpendicular to a plane of abutment between the stationary die and the rotatable die;
   means for rotating the rotatable die from said first position about the axis of rotation so that the rotatable die is rotated out of registration with the stationary die to shear extruded stock extending through both the stationary die and the rotatable die, said means for rotating comprising:
      a motor having an output shaft driveable in rotation;
      a cam arm mounted for rotation by said output shaft of said motor, said cam arm having an eccentric end extending radially from an axis of rotation of said cam arm;
      a cam roller mounted for rotation on said eccentric end of said cam arm;
      a die lever extending from said rotatable die generally radially from the axis of rotation of said rotatable die, said lever having a cam abutting surface, said cam roller abutting said cam abutting surface of said lever and rollable therealong during a portion of a rotation cycle of said cam arm; and
   means for returning the rotatable die to the position in registration with the stationary die, said means for returning including a compression spring pushing against said lever and biasing said rotatable die to the first position in registration with said stationary die; and
   an adjustable stop member mounted to abut said die lever when said die lever is in said first position and thereby prevent rotation of said die lever past said first position, said adjustable stop member being adjustable so as to selectively align the second shearing die with the first shearing die when in the first position.

* * * * *

UNITED STATES PATENT AND TRADEMARK OFFICE
CERTIFICATE OF CORRECTION

PATENT NO. : 5,065,653
DATED : November 19, 1991
INVENTOR(S) : John A. Werner

It is certified that error appears in the above-indentified patent and that said Letters Patent is hereby corrected as shown below:

Column 4, line 47, change "5" to --50--.
Column 7, line 2, claim 2, change "rotation" to -- rotatable--.

Signed and Sealed this

Twenty-sixth Day of September, 1995

Attest:

BRUCE LEHMAN

*Attesting Officer*         *Commissioner of Patents and Trademarks*